Oct. 18, 1932.   B. W. GONSER   1,883,235
METHOD OF TREATING ZINC ORES
Original Filed Oct. 12, 1929
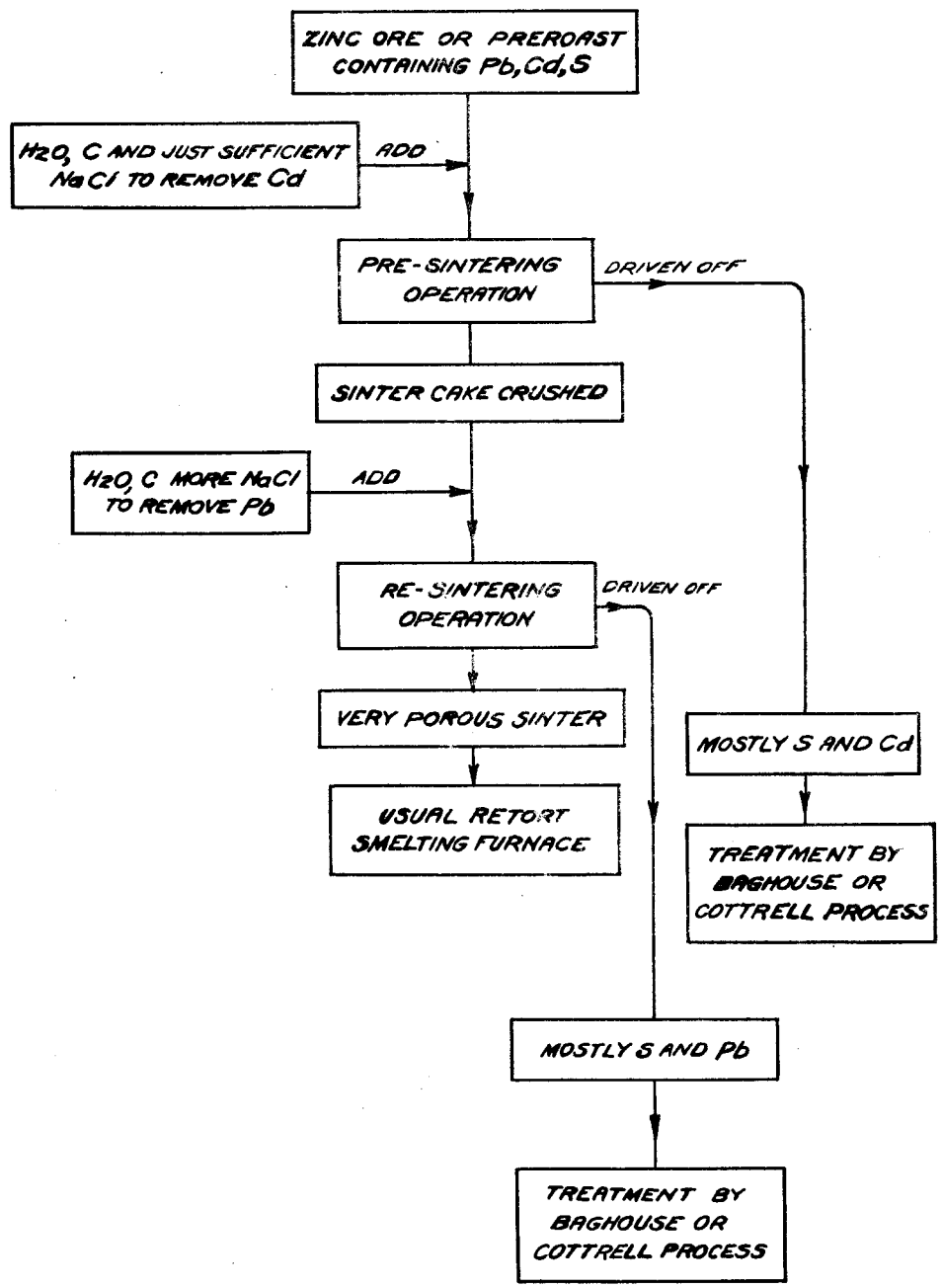

Patented Oct. 18, 1932

1,883,235

UNITED STATES PATENT OFFICE

BRUCE W. GONSER, OF AMARILLO, TEXAS, ASSIGNOR TO AMERICAN SMELTING AND REFINING COMPANY, OF NEW YORK, N. Y., A CORPORATION OF NEW JERSEY

METHOD OF TREATING ZINC ORES

Application filed October 12, 1929, Serial No. 399,137. Renewed October 21, 1931.

The invention relates to metallurgy, and more particularly to a method of separating and recovering lead and cadmium from zinc ores.

According to the invention various metals may be separated and recovered, such as cadmium, lead and zinc from an ore containing such metals by subjecting the ore combined with a suitable chloridizing agent to repeated blast roasting operations to selectively volatilize the metals.

In carrying out the process a chloridizing reagent, which is preferably sodium chloride or zinc chloride, may be mixed with the ore or concentrates and the resulting charge is subjected to a blast roasting operation, preferably on a straight line sintering machine, in which the charge is treated in a thin layer with a progressive zone of combustion. The conditions may be adjusted so that a large part of the cadmium is volatilized, after which the material is again mixed with the chloridizing reagent and subjected to another and similar blast roasting operation in which a large part of the lead may be volatilized. If desired, the resultant material, which may contain mostly zinc with the amount of undesired impurities substantially reduced, may be treated in the usual zinc retort furnace. If desired no chloridizing agent at all may be used in the first sintering operation while the chloridizing reagent may be used in the second sintering operation.

Various other features and advantages of the invention will be apparent from the following particular description and from an inspection of the accompanying drawing in which the figure is a flow sheet illustrating the process.

Although the novel features which are believed to be characteristic of this invention will be particularly pointed out in the claims appended hereto, the invention itself, as to its objects and advantages, the mode of its operation and the manner of its organization, may be better understood by referring to the following description in which a particular commercial embodiment thereof is disclosed. It will be understood, however, that the processes and steps thereof may be modified in various respects without departing from the broad spirit and scope of the invention.

In the following description and in the claims the various steps in the process and the details comprising the invention will be identified by specific names for convenience, but they are intended to be as generic in their application as the art will permit.

The drawing shows a flow sheet of the process.

Referring now to the flow sheet, one form of process for carrying out the invention will be described. The material which may be zinc ore, zinc concentrates or pre-roast may contain any one or more impurities, such as cadmium, lead, copper, gold, silver and sulphur. The material is mixed with a suitable amount of moisture, carbon and chloridizing reagent, such as common salt, and the mixture is preferably made quite intimate. The mixture is then fed to a sintering machine where it is subjected to a blast roasting operation, the zinciferous material being exposed temporarily to a high degree of heat. The conditions are preferably adjusted so that this operation removes as much sulphur and cadmium as possible, and as small an amount of lead as possible.

The cadmium and lead are chloridized and volatilized by the blast roasting operation. and the fume is recovered either by a Cottrell precipitator or a baghouse.

The blast roasted product from the sintering machine is then crushed and intimately mixed with a suitable amount of water, carbon and common salt, and is then subjected to a second or re-sintering operation. The conditions of the second sintering operation are preferably such that most of the remaining sulphur is volatilized together with the remaining cadmium and as much of the lead as possible.

The material from the sintering machine constitutes a very porous sinter and may be further sintered, if desired, or may be fed to the usual zinc retort furnace for the recovery of the zinc. It will be understood that the fume from the second and further sintering operations is recovered by Cottrell precipitators or bag houses in the usual manner.

During the first or pre-sintering operation having as its object the removal of as much sulphur and cadmium as possible, great care need not necessarily be taken and occasional unsintered material or precipitated fume does no irreparable damage because the secondary sintering takes care of these operating weaknesses. The entire product from the first sintering step may be crushed to a minus six mesh forming a mixture of sinter pellets and dust very much like the original preroast. This mixture sinters easily, quickly and completely, forming a clean, hard and porous sinter and which does not reduce to dust when crushed.

A relatively small amount of moisture, coke or coal and a smaller ignition flame is needed for the second sintering operation. Because of the great porosity of the charge it sinters through very quickly and there is no trouble in using a large percentage of reagent or in obtaining a high local temperature.

It has been found that the amount of sulphur present in the preroasted ore prior to the first sintering operation is important both because of its effect on obtaining a well sintered product and also because of its effect upon reactions whereby cadmium is volatilized. In general a low sulphur charge of below 3% or 4% sulphur is desirable when sintering with salt, although very good lead and cadmium eliminations have been obtained from a charge having from 7% to 12% sulphur.

In order to obtain a selective removal of the cadmium insufficient salt to combine with both the lead and cadmium or no chloridizing agent whatever should be used in the first roasting operation. In the second roasting operation additional salt is added to volatilize the lead, and other impurities if desired. Under some conditions substantially all the cadmium with comparatively little lead is volatilized in the first sintering operation and substantially all the lead with substantially no cadmium is volatilized in the second sintering operation, and in both sintering operations substantially no zinc is volatilized.

The preferred form of sintering machine is the well known, straight line, Dwight-Lloyd type in which the material is spread in a thin layer on a travelling grate, ignited and subjected to a down draft passing through the bed. With this machine the zone of combustion is progressive. Under certain conditions, it may be advantageous to add the fuel or chloridizing agent or both to the lower portion of the sinter bed where it would be of maximum benefit, in either or all of the sintering operations.

There are many advantages obtained by subjecting the ore to repeated sintering operations. In the first place a greater elasticity of operating conditions can be tolerated. Also a more uniform low sulphur product is obtained for the zinc furnace. The second sintering operation is easy to control, effectively sinters the relatively mixed charge and acts as a safety factor to overcome poor sulphur elimination or occasional unsintered material produced during the primary sintering. In addition a better total cadmium-lead elimination is secured by the repeated blast roasting operation and chloridizing action. In addition the selective volatilization of various impurities such as cadmium, lead, etc. may be secured and these materials recovered for their commercial value. Any chlorides formed in the first sintering operation unvolatilized are completely expelled during the subsequent sintering operations.

It will be understood that the relative quantities of materials used and the temperatures obtained depend upon the type of ore, the operating conditions and the result desired. It will be understood that various conditions of resintering might be obtained. For instance, the reagent may be used in only one of the steps and preroast or raw ore may be mixed with the sinter material prior to the resintering operation.

It will also be understood that other chloridizing agents such as calcium, zinc or magnesium chlorides may be used in place of sodium chloride. Likewise other machinery than a commercial straight line sintering machine may be used to produce the chloride volatilization so long as the conditions therein approximate those obtained in the sintering machine.

While certain novel features of the invention have been shown and described and are pointed out in the annexed claims, it will be understood that various omissions, substitutions and changes may be made by those skilled in the art without departing from the spirit of the invention.

What is claimed is:

1. The process of purifying a zinc-bearing material of sulphide character contaminated with impurities including lead and cadmium which comprises mixing said zinc-bearing material with water, sodium chloride and carbon in restricted amounts just sufficient to effect removal of cadmium as a volatile chloride, forming said mixture into a relatively thin, quiescent bed, moving said bed while subjecting the same to a blast roasting temperature just high enough for a limited period of time sufficient to cause the volatilization of the bulk of cadmium without removing any material amounts of lead, immediately thereafter quickly cooling the thus heated mixture to reduce the temperature of said bed so as to prevent practically wholly the volatilization of lead, crushing the solid residue resulting from the aforesaid treatment, mixing with said crushed material water, carbon and sodium chloride in amounts just sufficient to effect removal of substantially all of said lead, forming said mixture into a relatively thin, quiescent bed, moving said bed while subjecting the same to a blast roasting temperature having a sufficiently high local temperature for a restricted period of time to effect volatilization of practically all of the lead without causing the loss of any material amount of zinc, immediately thereafter quickly cooling the heated mixture to reduce the temperature of said bed so as to further minimize the loss of zinc by volatilization and then subjecting the double heat treated and chloridized residue substantially freed from lead, cadmium and sulphur for the recovery of zinc.

2. The process of purifying a zinc-bearing material contaminated with impurities including lead and cadmium which comprises mixing said zinc-bearing material with water, sodium chloride and carbon in restricted amounts just sufficient to effect removal of cadmium as a volatile chloride, forming said mixture into a relatively thin, quiescent bed, moving said bed while subjecting the same to a blast roasting temperature just high enough for a limited period of time sufficient to cause the volatilization of the bulk of cadmium without removing any material amounts of lead, immediately thereafter quickly cooling the thus heated mixture to reduce the temperature of said bed so as to prevent practically wholly the volatilization of lead, crushing the solid residue resulting from the aforesaid treatment, mixing with said crushed material water, carbon and sodium chloride in amounts just sufficient to effect removal of substantially all of said lead, forming said mixture into a relatively thin, quiescent bed, moving said bed while subjecting the same to a blast roasting temperature having a sufficiently high local temperature for a restricted period of time to effect volatilization of practically all of the lead without causing the loss of any material amount of zinc, immediately thereafter quickly cooling the heated mixture to reduce the temperature of said bed so as to further minimize the loss of zinc by volatilization and then subjecting the double heat treated and chloridized residue substantially freed from lead and cadmium for the recovery of zinc.

3. The process of purifying a zinc-bearing material of sulphide character contaminated with impurities including lead and cadmium which comprises mixing said zinc-bearing material with water, a chloride of the alkali or alkaline earth group and carbon in restricted amounts just sufficient to effect removal of cadmium as a volatile chloride, forming said mixture into a relatively thin, quiescent bed, moving said bed while subjecting the same to a blast roasting temperature just high enough for a limited period of time sufficient to cause the volatilization of the bulk of cadmium without removing any material amounts of lead, immediately thereafter quickly cooling the thus heated mixture to reduce the temperature of said bed so as to prevent practically wholly the volatilization of lead, crushing the solid residue resulting from the aforesaid treatment, mixing with said crushed material water, carbon and chloride of the alkali or alkaline earth group in amounts just sufficient to effect removal of substantially all of said lead, forming said mixture into a relatively thin, quiescent bed, moving said bed while subjecting the same to a blast roasting temperature having a sufficiently high local temperature for a restricted period of time to effect volatilization of practically all of the lead without causing the loss of any material amount of zinc, immediately thereafter quickly cooling the heated mixture to reduce the temperature of said bed so as to further minimize the loss of zinc by volatilization and then subjecting the double heat treated and chloridized residue substantially freed from lead, cadmium and sulphur for the recovery of zinc.

4. The process of purifying a zinc-bearing material contaminated with impurities including lead and cadmium which comprises mixing said zinc-bearing material with water, sodium chloride and carbon in restricted amounts just sufficient to effect removal of cadmium as a volatile chloride, forming said mixture into a relatively thin, quiescent bed, moving said bed while subjecting the same to a blast roasting temperature just high enough for a limited period of time sufficient to cause the volatilization of the bulk of cadmium, immediately thereafter quickly cooling the thus heated mixture to reduce the temperature of said bed, crushing the solid residue resulting from the aforesaid treatment, mixing with said crushed material water, carbon and sodium chloride in amounts just sufficient to effect removal of substantially all of said lead, forming said mixture into a relatively thin, quiescent bed, moving said bed while subjecting the same to a blast roasting temperature having a sufficiently high local temperature for a restricted period of time to effect volatilization of practically all of the lead without causing the loss of any material amount of zinc, immediately thereafter quickly cooling the heated mixture to reduce the temperature of said bed so as to further minimize the loss of zinc by volatilization and then subjecting the double heat treated and chloridized residue substantially freed from lead, cadmium and sulphur for the recovery of zinc.

5. The process of purifying a zinc-bearing material of sulphide character contaminated with impurities including lead and cadmium which comprises mixing said zinc-bearing material with water, sodium chloride and carbon in restricted amounts just sufficient to effect removal of cadmium as a volatile chloride, forming said mixture into a relatively thin, quiescent bed, moving said bed while subjecting the same to a progressive zone of combustion including a down draft roasting temperature just high enough for a limited period of time sufficient to cause the volatilization of the bulk of cadmium without removing any material amounts of lead, immediately thereafter quickly cooling the thus heated mixture to reduce the temperature of said bed so as to prevent practically wholly the volatilization of lead, crushing the solid residue resulting from the aforesaid treatment, mixing with said crushed material water, carbon and sodium chloride in amounts just sufficient to effect removal of substantially all of said lead, forming said mixture into a relatively thin, quiescent bed, moving said bed while subjecting the same to a progressive zone of combustion including a down draft blast roasting temperature having a sufficiently high local temperature for a restricted period of time to effect volatilization of practically all of the lead without causing the loss of any material amount of zinc, immediately thereafter quickly cooling the heated mixture to reduce the temperature of said bed so as to further minimize the loss of zinc by volatilization and then subjecting the double heat treated and chloridized residue substantially freed from lead, cadmium and sulphur for the recovery of zinc.

6. The process of purifying zinc material of sulphide character contaminated with impurities including lead and cadmium which comprises mixing said zinc bearing material with water and a solid chloridizing agent in restricted amounts just sufficient to effect removal of cadmium as a volatile chloride, forming said mixture into a relatively thin, quiescent bed, moving said bed while subjecting the same to a blast roasting temperature just high enough for a limited period of time sufficient to cause the volatilization of the bulk of the cadmium without removing any material amounts of lead, immediately thereafter quickly cooling the thus heated mixture to reduce the temperature of said bed so as to prevent practically wholly the volatilization of lead and/or zinc, crushing the solid residue resulting from the aforesaid treatment, mixing the crushed material with water and a solid chloridizing agent in restricted amounts just sufficient to effect the removal of substantially all of the lead, forming said mixture into a relatively thin, quiescent bed, moving said bed while subjecting the same to a blast roasting temperature having a sufficiently high local temperature for a restricted period of time to effect volatilization of practically all of the lead without causing the loss of any material amount of zinc and immediately thereafter quickly cooling the heated mixture to reduce the temperature of said bed so as to further minimize the loss of zinc by volatilization whereby a zinc bearing material is produced which is substantially freed from cadmium and/or lead.

7. The process of purifying zinc material of sulphide character contaminated with impurities including lead and cadmium which comprises mixing said zinc bearing material with water, a carbonaceous fuel and a salt chloride in restricted amounts just sufficient to effect removal of cadmium as a volatile chloride, forming said mixture into a relatively thin, quiescent bed, moving said bed while subjecting the same to a blast roasting temperature just high enough for a limited period of time sufficient to cause the volatilization of the bulk of the cadmium without removing any material amounts of lead, immediately thereafter quickly cooling the thus heated mixture to reduce the temperature of said bed so as to prevent practically wholly the volatilization of lead and/or zinc, crushing the solid residue resulting from the aforesaid treatment, mixing the crushed material with water, a carbonaceous fuel and a salt chloride in restricted amounts just sufficient to effect the removal of substantially all of the lead, forming said mixture into a relatively thin, quiescent bed, moving said bed while subjecting the same to a blast roasting temperature having a sufficiently high local temperature for a restricted period of time to effect volatilization of practically all of the lead without causing the loss of any material amount of zinc and immediately thereafter quickly cooling the heated mixture to reduce the temperature of said bed so as to further minimize the loss of zinc by volatilization whereby a zinc bearing material is produced which is substantially freed from cadmium and/or lead.

In testimony whereof I have hereunto set my hand.

BRUCE W. GONSER.